(12) United States Patent
Watanabe et al.

(10) Patent No.: US 6,274,853 B1
(45) Date of Patent: Aug. 14, 2001

(54) HEATING RESISTOR, HEATING RESISTOR FOR USE IN CERAMIC HEATER, AND CERAMIC HEATER USING THE SAME

(75) Inventors: Sindo Watanabe; Masahiro Konishi, both of Aichi (JP)

(73) Assignee: NGK Spark Plug Co., Ltd., Nagoya (JP)

(*) Notice: Subject to any disclaimer, the term of this patent is extended or adjusted under 35 U.S.C. 154(b) by 0 days.

(21) Appl. No.: 09/563,435

(22) Filed: May 3, 2000

(30) Foreign Application Priority Data

May 21, 1999 (JP) .................................... 11-141919

(51) Int. Cl.⁷ .............................. H05B 3/02; H05B 3/10; F23Q 7/22
(52) U.S. Cl. .................... 219/538; 219/270; 219/548; 219/553
(58) Field of Search ..................... 219/270, 267–269, 219/544, 552, 553, 538, 548; 123/145 A, 145 R; 361/264–266; 501/87, 92, 97

(56) References Cited

U.S. PATENT DOCUMENTS

| | | | |
|---|---|---|---|
| 5,114,888 | 5/1992 | Mizauno et al. | 501/96 |
| 5,750,958 | * 5/1998 | Okuda et al. | 219/544 |
| 5,883,360 | * 3/1999 | Tatematsu et al. | 219/270 |

FOREIGN PATENT DOCUMENTS

| | | | |
|---|---|---|---|
| 0 763 693 A1 | 3/1997 | (EP) . | |
| 3-218973 | 9/1991 | (JP) . | |
| 5-234665 | 9/1993 | (JP) . | |
| 9-137945 | 5/1997 | (JP) . | |
| 9-180866 | * 7/1997 | (JP) | 219/270 |

* cited by examiner

*Primary Examiner*—Tu Ba Hoang
(74) *Attorney, Agent, or Firm*—Sughrue, Mion, Zinn, Macpeak & Seas, PLLC

(57) ABSTRACT

A heating resistor containing $RE_2O_3$ (where RE represents a rare earth element) in a predetermined amount. The mole ratio of residual oxygen to $RE_2O_3$, the amount of residual oxygen being expressed on an $SiO_2$ basis and being obtained by subtracting the amount of oxygen contained in $RE_2O_3$ from the total amount of oxygen, falls within a predetermined range. A crystal phase of disilicate or melilite serves as a predominant phase of grain boundaries. The heating resistor contains a conductive component, such as WC or TiN, which contains one or more elements selected from among Ti, Zr, Hf, V, Nb, Ta, Cr, Mo, and W. The heating resistor is embedded in a substrate, yielding a ceramic heater.

13 Claims, 2 Drawing Sheets

HEATING RESISTOR, HEATING RESISTOR FOR USE IN CERAMIC HEATER, AND CERAMIC HEATER USING THE SAME

BACKGROUND OF THE INVENTION

1. Field of the Invention

The present invention relates to a heating resistor, a heating resistor for use in a ceramic heater, and a ceramic heater using the heating resistor. More particularly, the present invention relates to a heating resistor having excellent heat resistance and being useful in applications where oxidation thereof raises no problem; a heating resistor for use in a ceramic heater to be used in special applications requiring heating, such as a water heater and a glow plug of a diesel engine; and a ceramic heater which includes the heating resistor for use in a ceramic heater embedded in a substrate thereof.

2. Description of the Related Art

Conventionally, there has been known a highly heat-resistant sintered silicon nitride compact having in grain boundaries a crystal phase which is composed of, for example, disilicate having a high melting point, or melilite having an even higher melting point. Also, in manufacture of a heating resistor composed of conductive ceramic such as WC, $MoSi_2$, or TiN and silicon nitride ceramic, there is obtained a sintered compact which has a glass phase in grain boundaries thereof as a result of the use of a sintering aid such as MgO or an $Al_2O_3$—$Y_2O_3$ system, which sintering aid forms a liquid phase at relatively low temperature. Such a sintered compact has been used in various applications.

In a ceramic heater having a heating resistor embedded in a substrate thereof, the surface temperature of the heater becomes considerably high while the ceramic heater is being energized. Particularly, in a high-temperature-type glow plug, the surface temperature rises to about 1400° C., and the temperature of a portion of the interior rises to 1500° C. or higher.

The aforementioned sintered compact having melilite in grain boundaries has excellent mechanical strength at high temperature, but involves disadvantages in that oxidation tends to occur at relatively low temperature and that cracking may arise from volume expansion. In a sintered compact having a crystal phase such as a melilite phase or a disilicate phase, the crystal phase has a high melting point, but, in the case of a certain composition, a vitreous substance of relatively low melting point remains in grain boundaries in a small amount. As a result, even when such a crystal phase is precipitated in a heating resistor which contains a conductive component, the vitreous substance conceivably causes impairment in working durability. Such impairment has not yet been verified.

In manufacture of a heating resistor, when a sintering aid, such as MgO or an $Al_2O_3$—$Y_2O_3$ system, which forms a liquid phase at relatively low temperature is used, the sintering aid remains in the form of a glass phase of low melting point in the grain boundaries of silicon nitride ceramic after firing is completed. The remaining glass phase impairs mechanical strength at high temperature and working durability of a heating resistor and a ceramic heater using the heating resistor. Particularly, in the case of a high-temperature-type glow plug, which involves a temperature rise to 1500° C. or higher at a certain portion thereof, a heater may break due to impairment in strength, or a heating resistor may break due to decomposition of the glass phase in grain boundaries caused by a potential difference induced during application of electricity. In order to suppress the decomposition, there has been proposed a method in which nitrogen is introduced into the grain boundaries so as to increase viscosity of the grain boundaries through formation of oxynitride glass. However, the method fails to solve the problem sufficiently.

SUMMARY OF THE INVENTION

In view of the foregoing, an object of the present invention, which solves the above-mentioned problems involved in a conventional heating resistor, is to provide a heating resistor which contains a predominant crystal phase of melilite or disilicate in grain boundaries, which is sufficiently densified, and, particularly, a heating resistor which can sufficiently endure use in a particular application where oxidation thereof raises no problem.

Another object of the present invention is to provide a heating resistor for use in a ceramic heater, having a specific composition wherein a crystal phase of a high melting point is established as a predominant phase in grain boundaries to thereby provide excellent mechanical strength at high temperature and sufficient working durability, as well as to provide a ceramic heater having the heating resistor embedded in a substrate thereof.

According to a first aspect of the present invention, there is provided a heating resistor formed of a silicon nitride ceramic containing silicon nitride in a predominant amount, a conductive component, and a rare earth element (RE), wherein the rare earth element is contained in an amount of 1–6 mol % as reduced to $RE_2O_3$; the mole ratio (hereinafter referred to as the $SiO_2/RE_2O_3$ ratio) of residual oxygen to $RE_2O_3$ is 1–5, the amount of residual oxygen being expressed on a silicon oxide ($SiO_2$) basis and being obtained by subtracting the amount of oxygen contained in the rare earth element oxide from the total amount of oxygen contained in the heating resistor; and a predominant phase of the heating resistor other than the conductive component and the silicon nitride is melilite ($RE_2O_3 \cdot Si_3N_4$).

When $RE_2O_3$ is contained in the silicon nitride ceramic in an amount of less than 1 mol %, the silicon nitride ceramic encounters difficulty in densification. In contrast, when $RE_2O_3$ is contained in excess of 6 mol %, even when the $SiO_2/RE_2O_3$ ratio falls within the preferred range, the mechanical strength tends to be impaired. Particularly, in the case of application to a member of a ceramic heater, the durability at high temperature is impaired. That is, when $RE_2O_3$ is contained in an amount as specified in the present invention, a sintered compact of high strength and excellent durability can be obtained constantly.

When the $SiO_2/RE_2O_3$ ratio is less than 1, particularly in the case of $RE_2O_3$ being contained in a small amount, the strength and working durability are impaired greatly in application to, for example, a ceramic heater. In contrast, when the $SiO_2/RE_2O_3$ ratio is in excess of 5, the durability at high temperature tends to be impaired.

The heating resistor according to the first aspect comprises a predominant phase of melilite as well as the conductive component and silicon nitride. The melilite has a melting point as high as over 1800° C., thus enabling formation of a sintered compact of excellent heat resistance. However, as mentioned above, the melilite is likely to be oxidized at low temperature. Thus, this sintered compact is usefully applied to, for example, a heating member embedded in a ceramic heater and a water heater, since oxidation thereof raises no problem in such applications. Meanwhile, the silicon nitride ceramic constituting the heating resistor may be formed of a ceramic substantially containing silicon nitride only, but may also be formed of a ceramic containing silicon nitride and a Si—Al—O—N ceramic phase, for example.

According to a second aspect of the present invention, there is provided a heating resistor formed of a silicon nitride ceramic containing silicon nitride in a predominant amount, a conductive component, and a rare earth element (RE), wherein the rare earth element oxide is contained in an amount of 1–6 mol % as reduced to $RE_2O_3$; the mole ratio ($SiO_2/RE_2O_3$ ratio) of residual oxygen to $RE_2O_3$ is 2–5, the amount of residual oxygen being expressed on a silicon oxide ($SiO_2$) basis and being obtained by subtracting the amount of oxygen contained in the rare earth element oxide from the total amount of oxygen contained in the heating resistor; and a predominant phase of the heating resistor other than the conductive component and the silicon nitride is disilicate ($RE_2Si_2O_7$).

When $RE_2O_3$ is contained in the silicon nitride ceramic in an amount of less than 1 mol %, the silicon nitride ceramic encounters difficulty in densification. In contrast, when $RE_2O_3$ is contained in excess of 6 mol %, even when the $SiO_2/RE_2O_3$ ratio falls within the preferred range, the mechanical strength tends to be impaired. Particularly, in the case of application to a member of a ceramic heater, the durability at high temperature is impaired. $RE_2O_3$ is contained particularly preferably in an amount of 2–6 mol %, whereby a sintered compact of high strength and excellent durability can be obtained constantly.

When the $SiO_2/RE_2O_3$ ratio is less than 2, particularly in the case of $RE_2O_3$ being contained in a small amount, strength and working durability are impaired greatly in application to, for example, a ceramic heater. By contrast, when the $SiO_2/RE_2O_3$ ratio is in excess of 5, durability at high temperature tends to be impaired.

The heating resistor according to the second aspect comprises a predominant phase of disilicate as well as the conductive component and silicon nitride. Since disilicate is stable even in an oxidizing atmosphere of high temperature, the heating resistor is usefully applied to, for example, a heater of a glow plug. Meanwhile, the silicon nitride ceramic constituting the heating resistor may be formed of a ceramic substantially containing silicon nitride only, but may also be formed of a ceramic containing silicon nitride and Si—Al—O—N, for example.

The heating resistor according to the first or second aspect may be produced by mixing a conductive component powder, a silicon nitride material powder, an oxide powder which serves as an oxygen source during sintering, and an $RE_2O_3$ powder or a powder of a compound which generates $RE_2O_3$ through firing; and firing the resultant powder mixture.

The heating resistor according to the first or second aspect may contain as the conductive component at least one of suicides, carbides, and nitrides of one or more elements selected from among Ti, Zr, Hf, V, Nb, Ta, Cr, Mo, and W. Particularly, such a silicide, carbide, or nitride having a thermal expansion coefficient close to that of silicon nitride ceramic, such as WC, is preferred. Since the heating resistor is formed through sintering at high temperature, a conductive component having a high melting point, such as WC, TiN, or $MoSi_2$, is more preferred. The conductive component may contain another metallic compound; for example, a boride of a metallic element, such as $W_2B_5$, $TiB_2$, MoB, $MO_2B$, $MoB_2$, or CrB. Particularly, preferred is a metallic compound having a thermal expansion coefficient close to that of silicon nitride ceramic and a melting point sufficiently higher than the working temperature of a ceramic heater.

According to a third aspect of the present invention, the heating resistor according to first or second aspect of the present invention contains one or more elements selected from among Ti, Zr, Hf, V, Nb, Ta, Cr, Mo, and W.

As mentioned above, these elements are contained in the form of a conductive component, as well as in the form of an oxide which serves as an oxygen source during sintering. Preferably, there is used at least one oxide selected from among Group 4 element oxides, Group 5 element oxides, and Group 6 element oxides, preferably $V_2O_5$, $Nb_2O_3$, $Ta_2O_3$, $Cr_2O_3$, $MoO_3$, and $WO_3$, which are Group 5 element oxides and Group 6 element oxides. These oxides are particularly effective as sintering aids and improve sinterability. Particularly, $V_2O_5$, having a low melting point of 690° C., can promote sintering at low temperature. When $V_2O_5$ is used in combination with a Group 5 element oxide and/or a Group 6 element oxide ($Nb_2O_3$, $Ta_2O_3$, $Cr_2O_3$, $MoO_3$, or $WO_3$), sinterability is further improved by virtue of a synergistic effect.

According to a fourth aspect of the present invention, there is provided a heating resistor for use in a ceramic heater, which is embedded in a substrate of the ceramic heater and formed of a conductive silicon nitride ceramic which contains silicon nitride in a predominant amount and a conductive component, wherein a predominant phase of the conductive silicon nitride ceramic other than the conductive component and the silicon nitride assumes a crystal phase having a melting point of not lower than 1600° C.

The heating resistor for use in a ceramic heater may be produced by mixing a conductive component powder, a silicon nitride raw material powder, an oxide powder which serves as an oxygen source during sintering, and an $RE_2O_3$ powder or a compound powder which generates $RE_2O_3$ through firing; and firing the resultant powder mixture.

The substrate may be formed of a ceramic which is used as an insulating material in a ceramic heater, such as silicon nitride ceramic. Aluminum nitride may be additionally incorporated into the silicon nitride ceramic.

The above-mentioned conductive silicon nitride ceramic contains silicon nitride ceramic serving as an insulating component, and a conductive component, thereby forming the above-mentioned heating resistor. As the conductive component there may be used at least one of silicides, carbides, and nitrides of one or more elements selected from among Ti, Zr, Hf, V, Nb, Ta, Cr, Mo, and W. Particularly, such a silicide, carbide, or nitride having a thermal expansion coefficient close to that of silicon nitride ceramic, such as WC, is preferred. Since the heating resistor is formed through sintering at high temperature, a conductive component having a high melting point, such as WC, TiN, or $MoSi_2$, is more preferred. The conductive component may contain another metallic compound; for example, a boride of a metallic element, such as $W_2B_5$, $TiB_2$, MoB, $Mo_2B$, $MoB_2$, or CrB. Particularly, preferred is a metallic compound having a thermal expansion coefficient close to that of silicon nitride ceramic and a melting point sufficiently higher than the working temperature of a ceramic heater.

When a crystal phase serving as the predominant phase of the conductive silicon nitride ceramic other than the conductive component and the silicon nitride has a melting point lower than 1600° C., the resultant heating resistor fails to have high heat resistance. A ceramic heater having such a heating resistor embedded therein fails to exhibit sufficient mechanical strength at high temperature, and working durability thereof is impaired.

According to a fifth aspect of the present invention, there is provided a heating resistor for use in a ceramic heater, which is embedded in a substrate of the ceramic heater and formed of conductive silicon nitride ceramic which contains silicon nitride in a predominant amount and a conductive component, wherein the silicon nitride ceramic contains 1–6 mol % of $RE_2O_3$ (where RE is a rare earth element); the mole ratio ($SiO_2/RE_2O_3$ ratio) of residual oxygen to $RE_2O_3$ is 2–5, the amount of residual oxygen being expressed on a silicon oxide ($SiO_2$) basis and obtained by subtracting the amount of oxygen contained in the rare earth element oxide from the total amount of oxygen contained in the heating resistor; and a predominant phase of the conductive silicon nitride ceramic other than the conductive component and the silicon nitride is disilicate (having a melting point of about 1650–1700° C.).

When $RE_2O_3$ is contained in the silicon nitride ceramic in an amount of less than 1 mol %, the resultant conductive silicon nitride ceramic encounters difficulty in densification with a resultant impairment in mechanical strength and durability, thus failing to provide a heating resistor applicable to practical use. In contrast, when $RE_2O_3$ is contained in excess of 6 mol %, the mechanical strength tends to be impaired, and the durability is impaired. When the $SiO_2/RE_2O_3$ ratio is less than 2, the predominant phase assumes a crystal phase of monosilicate. As a result, the mechanical strength and durability tend to be impaired. In contrast, when the $SiO_2/RE_2O_3$ ratio is in excess of 5, the durability is impaired, whereas the mechanical strength remains substantially unaffected.

According to a sixth aspect of the present invention, there is provided a heating resistor for use in a ceramic heater, which is embedded in a substrate of the ceramic heater and formed of conductive silicon nitride ceramic which contains silicon nitride in a predominant amount a conductive component, wherein the silicon nitride ceramic contains 1–6 mol % of $RE_2O_3$ (where RE is a rare earth element); the mole ratio ($SiO_2/RE_2O_3$ ratio) of residual oxygen to $RE_2O_3$ 1–5, the amount of residual oxygen being expressed on a silicon oxide ($SiO_2$) basis and obtained by subtracting the amount of oxygen contained in the rare earth element oxide from the total amount of oxygen contained in the conductive silicon nitride ceramic; and a predominant phase of the conductive silicon nitride ceramic other than the conductive component and the silicon nitride is melilite (having a melting point of about 1800–1850° C.).

When $RE_2O_3$ is contained in the silicon nitride ceramic in an amount of less than 1 mol %, the resultant conductive silicon nitride ceramic encounters difficulty in densification with a resultant impairment in mechanical strength and durability, thus failing to provide a heating resistor applicable to actual use. In contrast, when $RE_2O_3$ is contained in excess of 6 mol %, the mechanical strength tends to be impaired, and the durability is impaired. When the $SiO_2/RE_2O_3$ ratio is less than 1, particularly in the case of $RE_2O_3$ being contained in a small amount, the strength and working durability are impaired greatly. In contrast, when the $SiO_2/RE_2O_3$ ratio is in excess of 5, durability is impaired, whereas strength remains substantially unaffected.

The heating resistor for use in a ceramic heater according to the fifth or sixth aspect may be produced by mixing a conductive component powder, a silicon nitride raw material powder, an oxide powder which serves as an oxygen source during sintering, and an $RE_2O_3$ powder or a compound powder which generates $RE_2O_3$ during sintering; and sintering the resultant powder mixture.

The heating resistor for use in a ceramic heater according to the fifth or sixth aspect may contain as the conductive component at least one of silicides, carbides, and nitrides of one or more elements selected from among Ti, Zr, Hf, V, Nb, Ta, Cr, Mo, and W. Particularly, such a silicide, carbide, or nitride having a thermal expansion coefficient close to that of silicon nitride ceramic, such as WC, is preferred. A conductive component having a high melting point, such as WC, TiN, or $MoSi_2$, is more preferred. The conductive component may contain another metallic compound; for example, a boride of a metallic element, such as $W_2B_5$, $TiB_2$, MoB, $Mo_2B$, $MoB_2$, or CrB. Particularly, preferred is a metallic compound having a thermal expansion coefficient close to that of silicon nitride ceramic and a melting point sufficiently higher than the working temperature of a ceramic heater.

According to the fifth and sixth aspects, $RE_2O_3$ contained in the silicon nitride ceramic serves as a sintering aid. Through employment of $RE_2O_3$ as a sintering aid, a crystal phase of high melting point, such as melilite or disilicate, precipitates in grain boundaries of ceramic during a cooling process after firing. Such a crystal phase of high melting point is also generated when, for example, $Y_2O_3$ is used as a sintering aid. However, only $RE_2O_3$ can impart excellent heat resistance and durability to a heating resistor.

According to a seventh aspect of the present invention, the heating resistor for use in a ceramic heater according to any one of the fourth to sixth aspects of the present invention is further characterized in that the conductive silicon nitride ceramic contains one or more elements selected from among Ti, Zr, Hf, V, Nb, Ta, Cr, Mo, and W.

As mentioned above, these elements are contained in the form of a conductive component as well as in the form of an oxide which serves as an oxygen source during sintering. Preferably, there is used at least one oxide selected from among $V_2O_5$, $Nb_2O_3$, $Ta_2O_3$, $Cr_2O_3$, $MoO_3$, and $WO_3$, which are oxides of the above elements. These oxides are particularly effective as sintering aids and improve sinterability. Particularly, $V_2O_5$ can promote sintering at low temperature. When $V_2O_5$ is used in combination with an oxide of another element, such as $Nb_2O_3$, $Ta_2O_3$, $Cr_2O_3$, $MoO_3$, or $WO_3$, sinterability is further improved by virtue of a synergistic effect.

In the heating resistors according to the first through third aspects and the heating resistors for use in a ceramic heater according to the fourth through seventh aspects, through use of these oxides as sintering aids, which also serve as oxygen sources, excellent material properties (particularly, mechanical strength at room temperature and that at high temperature) are imparted thereto in relation to improved sinterability. Specifically, after firing, these metallic elements are present in grain boundaries in the form of silicides (for example, $VSi_2$, $V_5Si_3$, $NbSi_2$, $TaSi_2$, $CrSi_2$, $MoSi_2$, and $WSi_2$) or in the form of solid solutions of V and another Group 5 element and/or Group 6 element (for example, $(V-Mo)Si_2$). Having a very high melting point of 1500–2500° C., these silicides or solid solutions do not have an adverse effect on mechanical strength at high temperature of the heating resistors. Conceivably, these silicides or solid solutions are dispersed uniformly to thereby improve the material properties.

In the first through seventh aspects, the predominant phase denotes a component which exhibits the maximum peak value among components of the heating resistor other than the conductive component and silicon nitride when the heating resistor undergoes X-ray diffraction after firing. Also, the amount of residual oxygen as expressed on a silicon oxide ($SiO_2$) basis is obtained by subtracting the amount of oxygen contained in a rare earth element oxide from the total amount of oxygen contained in the heating resistor or the heating resistor for use in a ceramic heater. In this connection, when an oxide of an element other than Si is conceivably present in a fired product, the amount of oxygen contained in this conceivable oxide must be subtracted from the total amount of oxygen.

According to an eighth aspect of the present invention, there is provided a ceramic heater comprising a substrate and a heating resistor for use in a ceramic heater according to any one of the fourth through seventh aspects and embedded in the substrate.

Preferably, the ceramic heater is produced by mixing a material powder of an insulating component, such as a silicon nitride powder and a sintering aid powder, and a raw material powder of a conductive component composed of at least one of silicides, carbides, and nitrides of one or more elements selected from among Ti, Zr, Hf, V, Nb, Ta, Cr, Mo, and W; compacting the resulting mixture into a predetermined shape; placing the resulting compact in a raw material powder of silicon nitride for the formation of a substrate; compacting the resulting composite integrally into a predetermined shape of a heater; and firing the resultant compact at a predetermined temperature. Particularly, a WC powder, a TiN powder, and a $MoSi_2$ powder are preferred as the raw material powder of a conductive component, and may be used singly or in combination.

Through addition of $SiO_2$ and a rare earth element oxide at a predetermined proportion for use as sintering aids, an obtained heating resistor has a crystal phase of disilicate, which has a high melting point, formed in grain boundaries. Further, through addition of a rare earth element oxide and a certain metallic oxide, such as $WO_3$, at a predetermined ratio for use as sintering aids, an obtained heating resistor has a crystal phase of melilite, which has a melting point higher than that of disilicate, formed in grain boundaries. The thus-obtained heating resistor is embedded in a substrate, yielding a ceramic heater of excellent heat resistance and durability.

According to the first and second aspects, through addition of $RE_2O_3$ in a predetermined amount, an obtained heating resistor has a crystal phase of melilite or disilicate, which has a high melting point, formed predominantly in grain boundaries, and is thus densified sufficiently. According to the fifth and sixth aspects, through addition of $RE_2O_3$ in a predetermined amount, an obtained heating resistor for use in a ceramic heater has a crystal phase of high melting point formed predominantly in grain boundaries, and, thus, becomes highly heat-resistant. According to the eighth aspect, this highly heat-resistant heating resistor for use in a ceramic heater is embedded in a substrate, yielding a ceramic heater of excellent high-temperature durability.

DESCRIPTION OF THE PREFERRED EMBODIMENTS

Figure 1:
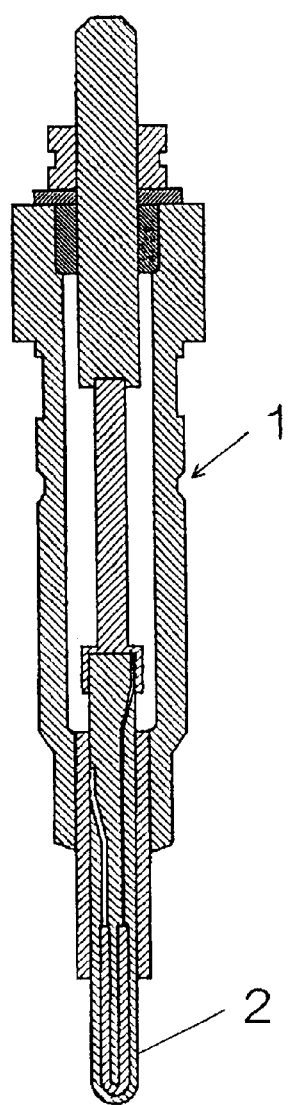
FIG. 1 is a longitudinal sectional view showing a glow plug into which a ceramic heater of the present invention is incorporated.

Embodiments of the present invention will next be described in detail by way of examples.

(1) Fabrication of Ceramic Heater

-1- Composition Corresponding to the Fifth Aspect of the Invention

An $SiO_2$ powder and an $Er_2O_3$ powder serving as sintering aids are added to a silicon nitride powder in respectively predetermined amounts so as to obtain a mixture serving as a raw material for an insulating component (the amount proportion between the powders to be added is determined such that the $RE_2O_3$ content in mol % of silicon nitride ceramic, which is a predominant component of conductive silicon nitride ceramic, and the $SiO_2/RE_2O_3$ mol ratio as measured after firing conform to Table 1). In Table 1, the symbol "MS" represents monosilicate, and the symbol "DS" represents disilicate.

TABLE 1

| | $Er_2O_3$ | $SiO_2$ | $SiO_2/Er_2O_3$ | XRD | Bending Strength | Working Durability at 1400° C. |
|---|---|---|---|---|---|---|
| Examples | | | | | | |
| 1 | *0.5 | 1.5 | 3 | Not densified | XX | XX |
| 2 | 1 | 1 | *1 | MS | CC | CC |
| 3 | | 2 | 2 | DS | BB | BB |
| 4 | | 3 | 3 | | | |
| 5 | | 5 | 5 | | | |
| 6 | | 6 | *6 | | | CC |
| 7 | 2–6 | 3 | *1 | MS | BB | CC |
| 8 | | 6 | 2 | DS | AA | BB |
| 9 | | 9 | 3 | | | |
| 10 | | 15 | 5 | | | |
| 11 | | 18 | *6 | | BB | CC |
| 12 | *8 | 8 | *1 | MS | CC | XX |
| 13 | | 16 | 2 | DS | BB | CC |
| 14 | | 24 | 3 | | CC | XX |
| 15 | | 40 | 5 | | XX | |
| 16 | | 48 | *6 | | | |

-2- Composition Corresponding to the Sixth Aspect of the Invention

An $Er_2O_3$ powder and a $WO_3$ powder serving as sintering aids are added to a silicon nitride powder in respectively predetermined amounts so as to obtain a mixture serving as a raw material for an insulating component (the amount proportion between the powders to be added is determined such that the $RE_2O_3$ content in mol % of silicon nitride ceramic, which is a predominant component of conductive silicon nitride ceramic, and the mole ratio ($WO_3$ as reduced to $SiO_2$)/$RE_2O_3$ as measured after firing conform to Table 2). In Table 2, the symbol "M" represents melilite.

TABLE 2

| Examples | Er$_2$O$_3$ | WO$_3$ on SiO$_2$ Basis | WO$_3$ (on SiO$_2$ Basis)/Er$_2$O$_3$ | XRD | Bending Strength | Working Durability at 1400° C. |
|---|---|---|---|---|---|---|
| 17 | **0.5 | 1.5 | 3 | Not densified | XX | XX |
| 18 | 1 | 0.5 | **0.5 | M | XX | XX |
| 19 |  | 1 | 1 |  | BB | AA |
| 20 |  | 3 | 3 |  |  |  |
| 21 |  | 5 | 5 |  |  |  |
| 22 |  | 6 | **6 |  |  | BB |
| 23 | 2–6 | 1.5 | **0.5 | M | CC | CC |
| 24 |  | 3 | 1 |  | AA | AA |
| 25 |  | 9 | 3 |  |  |  |
| 26 |  | 15 | 5 |  |  |  |
| 27 |  | 18 | **6 |  |  | CC |
| 28 | **8 | 4 | **0.5 | M | CC | CC |
| 29 |  | 8 | 1 |  | BB |  |
| 30 |  | 24 | 3 |  | CC | XX |
| 31 |  | 40 | 5 |  | XX |  |
| 32 |  | 48 | **6 |  |  |  |

-3- Use of Al$_2$O$_3$ and Y$_2$O$_3$ as Sintering Aids

An Al$_2$O$_3$ powder and a Y$_2$O$_3$ powder serving as sintering aids are added to a silicon nitride powder in respectively predetermined amounts so as to obtain a mixture serving as material for an insulating component (the respective amounts of Al$_2$O$_3$ and Y$_2$O$_3$ to be added are determined such that the Al$_2$O$_3$ content in mol % of and the Y$_2$O$_3$ content in mol % of silicon nitride ceramic, which is a predominant component of conductive silicon nitride ceramic, as measured after firing conform to Table 3). In Table 3, the symbol "M" represents melilite.

TABLE 3

| Examples | Al$_2$O$_3$ | Y$_2$O$_3$ | Grain Boundary Phase | Bending Strength | Working Durability at 1200° C. | Working Durability |
|---|---|---|---|---|---|---|
| 33 | 13 | — | Glassy | XX | XX | XX |
| 34 | 11 | 1 |  | BB | CC |  |
| 35 | 8 | 2 |  | AA | BB |  |
| 36 | 4 | 4 |  | BB |  |  |
| 37 | — | 6 | M | XX | XX |  |

The raw material for an insulating component (42% by weight) described in each of -1-, -2-, and -3- and a WC powder (58% by weight) serving as material for a conductive component were wet-mixed for 72 hours. The resulting mixture was dried, to thereby prepare a mixture powder. Subsequently, the mixture powder and a binder were kneaded in a kneading machine for 4 hours. The resulting kneaded substance was cut into pellets. The thus-obtained pellets were charged into an injection molding machine, yielding a U-shaped heater molding having tungsten lead wires attached to the corresponding ends thereof.

A sintering aid powder was added to a silicon nitride raw material powder. The resulting mixture was wet-mixed for 40 hours, followed by granulation through a spray-drying method. The thus-obtained granules underwent compaction so as to obtain two compact halves. Subsequently, the U-shaped heater molding was held in place between the two compact halves. The resulting assembly was pressed for embedment of the U-shaped heater molding between the two compact halves. The pressed assembly was further pressed for integration at 70 atms, obtaining a green ceramic heater. The green ceramic heater was calcined at 600° C. so as to remove the binder. Subsequently, the calcined compact was set in a hot-press carbon die and was then hot-press-fired in a nitrogen atmosphere, yielding a ceramic heater.

(2) Structure of Ceramic Heater

Figure 2:
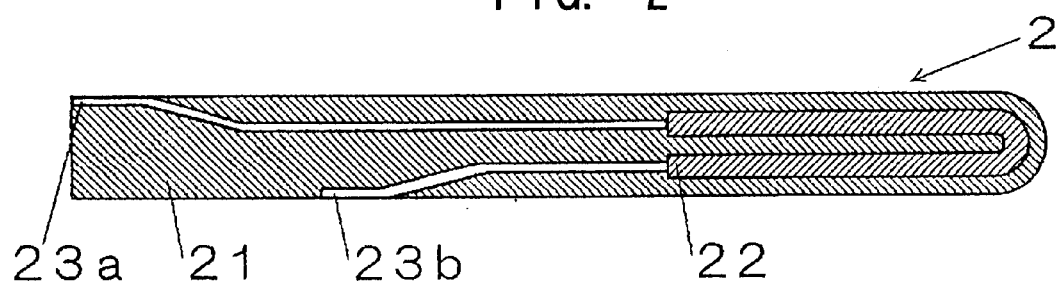
FIG. 2 is a longitudinal sectional view showing the ceramic heater of FIG. 1.
Figure 3:
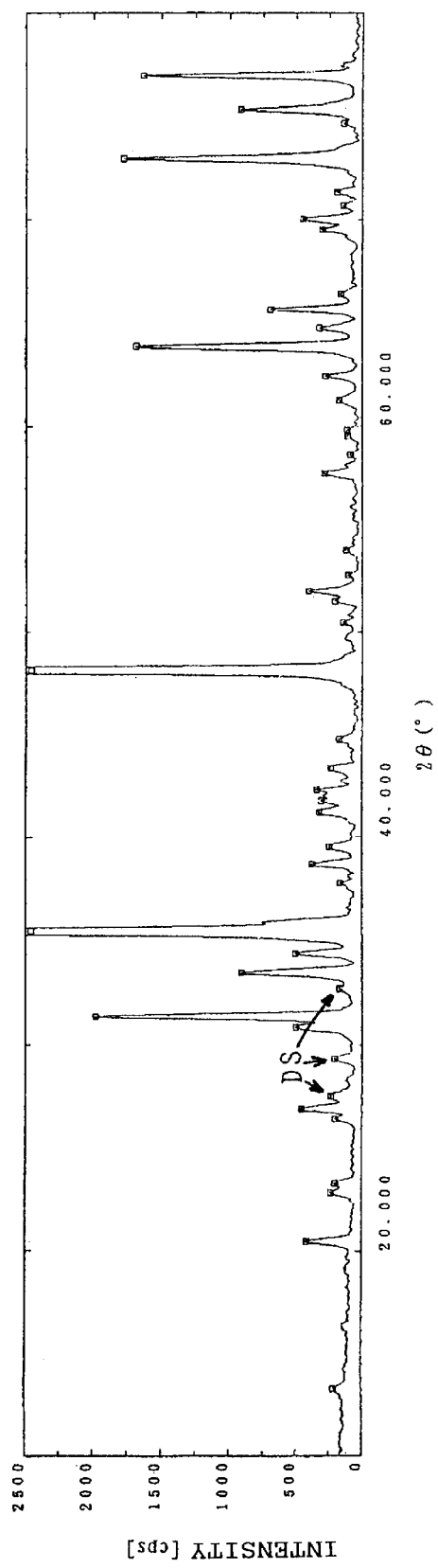
FIG. 3 is a chart showing the X-ray diffraction pattern of grain boundaries of conductive silicon nitride ceramic of Example 9.
Figure 4:
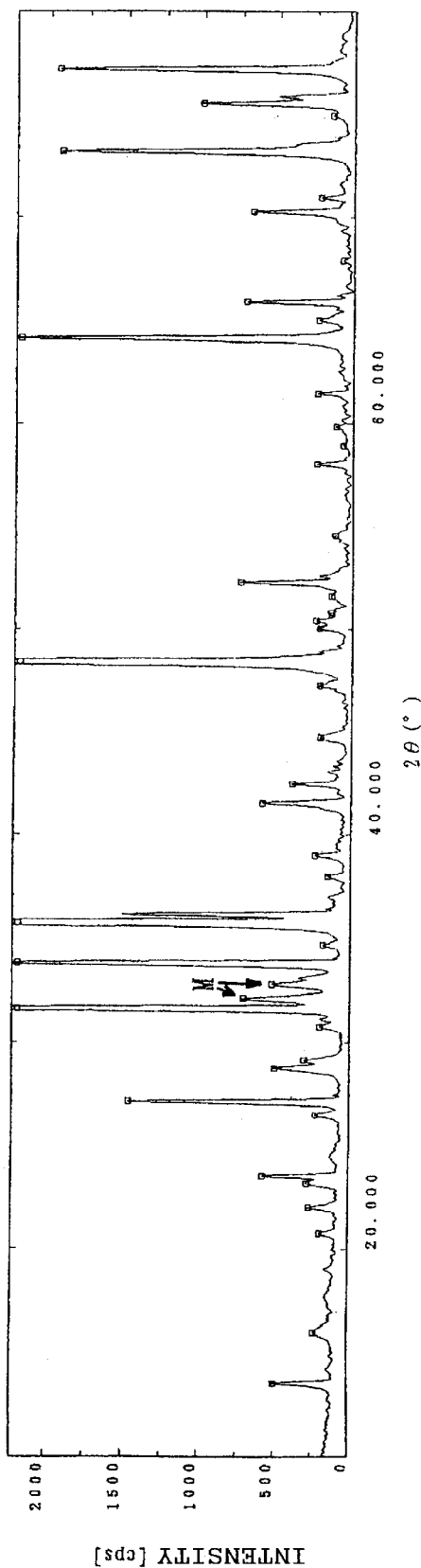
FIG. 4 is a chart showing the X-ray diffraction pattern of grain boundaries of conductive silicon nitride ceramic of Example 25.

FIG. 2 is a longitudinal sectional view showing a ceramic heater in which is embedded a heating resistor having a composition corresponding to the fifth aspect of the invention as described in -1-. FIG. 1 is a longitudinal sectional view showing a glow plug into which the ceramic heater is incorporated. As shown in FIG. 1, a glow plug 1 includes a ceramic heater 2 disposed at an end portion thereof. As shown in FIG. 2, the ceramic heater 2 includes a substrate 21, a heating resistor 22, and lead portions 23a and 23b.

The substrate 21 is formed of sintered silicon nitride and is adapted to protect the embedded heating resistor 22 and the lead portions 23a and 23b. Thus, even when grain boundaries of the conductive silicon nitride ceramic of the heating resistor 22 assume a crystal phase of melilite, the crystal phase is not oxidized. The heating resistor 22 assumes the form of a U-shaped bar and is embedded in the substrate 21. The heating resistor 22 contains a conductive component and an insulating component. As shown in FIG. 2, one end of the lead portion 23a (23b) formed of tungsten is located on the surface of the substrate 21, and the other end is connected to the corresponding end of the heating resistor 22, so that electricity supplied to the ceramic heater 2 from an external power source can be led to the heating resistor 22.

(3) Measurement of Bending Strength and Evaluation of Working Durability

-1- Bending Strength

The ceramic heaters were measured for bending strength according to JIS R 1601 (3-point bending; span: 20 mm; cross head speed: 0.5 mm/sec).

-2- Working Durability

Voltage was applied to each of the ceramic heaters for 1 minute such that a heating portion reaches a maximum temperature of 1400° C. Subsequently, voltage application was suspended for 1 minute. This on-off cycle was repeated until breaking of wire occurred. Working durability was evaluated in terms of the number of cycles counted until breaking of wire occurred. In the case of heaters of Table 3 produced by use of $Al_2O_3$ and $Y_2O_3$ as sintering aids, the working durability at a maximum temperature of 1200° C. was evaluated additionally in a similar manner.

The test results are shown in Tables 1, 2, and 3. In Table 1, the symbol "*" indicates that a value marked therewith falls outside the range of the fifth aspect of the invention. In Table 2, the symbol "**" indicates that a value marked therewith falls outside the range of the sixth aspect of the invention. Symbols appearing in Tables 1, 2, and 3 and indicating evaluation of bending strength and working durability are described below.

Bending strength: XX: less than 800 MPa; CC: 800 Mpa to less than 1100 MPa; BB: 1100 MPa to less than 1300 MPa; AA: 1300 MPa or higher Working durability: XX: less than 1000 cycles; CC: 1000 cycles to less than 5000 cycles; BB: 5000 cycles to less than 10,000 cycles; AA: 10,000 cycles or greater As seen from Table 1, Examples 3 to 5 and 8 to 10 (the composition of the fifth aspect of the invention was employed) provide heating resistors for use in a ceramic heater which have excellent bending strength and working durability. Particularly, when $Er_2O_3$ is contained in an amount of not less than 2 mol %, the bending strength is further improved. In the case of Example 1, in which the $Er_2O_3$ content is excessively low, densification is not sufficiently established, and the bending strength and durability are both impaired greatly. In the case of Examples 2, 7, and 12, in which the $SiO_2/Er_2O_3$ ratio is low, grain boundaries assume a crystal phase of monosilicate, and, particularly, the durability is impaired. In the case of Examples 6 and 11, in which the $SiO_2/Er_2O_3$ ratio is high, disilicate is formed, but the durability is impaired. In the case of Examples 13 to 15, in which the $Er_2O_3$ content is excessively high, disilicate is formed, but durability is impaired. Particularly, the bending strength is impaired with the $SiO_2/Er_2O_3$ ratio, and the durability is impaired greatly with the $SiO_2/Er_2O_3$ ratio. In the case of Example 16, in which the $Er_2O_3$ content is excessively high and the $SiO_2/Er_2O_3$ ratio is high, the bending strength and durability are both impaired greatly.

As seen from Table 2, Examples 19 to 21 and 24 to 26 (the composition of the sixth aspect of the invention was employed) provide heating resistors for use in a ceramic heater which have excellent bending strength and working durability. Particularly, when $Er_2O_3$ is contained in an amount of not less than 2 mol %, the bending strength is further improved. In the case of Example 17, in which the $Er_2O_3$ content is low, densification is not sufficiently established, and the bending strength and durability are both impaired greatly. In the case of Examples 18, 23, and 28, in which the ratio of $WO_3$ (on $SiO_2$ basis) to $Er_2O_3$ is low, the bending strength and durability both tend to be impaired. Particularly, in the case of Example 18, in which the $Er_2O_3$ content is low, the bending strength and durability are both impaired greatly. In the case of Examples 22 and 27, in which the ratio of $WO_3$ (on $SiO_2$ basis) to $Er_2O_3$ is high, the durability tends to be impaired. In the case of Examples 29 to 31, in which the $Er_2O_3$ content is excessively high, a melilite is formed, but the durability is impaired. Particularly, the bending strength is impaired with the ratio of $WO_3$ (on $SiO_2$ basis) to $Er_2O_3$, and the durability is impaired greatly with the ratio of $WO_3$ (on $SiO_2$ basis) to $Er_2O_3$. In the case of Example 32, in which the $Er_2O_3$ content is excessively high and the ratio of $WO_3$ (on $SiO_2$ basis) to $Er_2O_3$ is high, the bending strength and durability are both impaired greatly.

As seen from Table 3, Examples 33 to 37 employ conventional sintering aids. In the case of Examples 33 to 36, grain boundaries assume a glassy phase, and, in the case of Examples 34 to 36, the bending strength is sufficiently high. However, the durability is impaired; particularly, the durability at 1400° C. is impaired greatly. In the case of Example 37, which employs exclusively $Y_2O_3$, grain boundaries assume a crystal phase of melilite, but the bending strength and durability are both impaired greatly.

The present invention is not limited to the above-described embodiments, but may be embodied in many other specific forms according to purpose or application without departing from the spirit or scope of the invention. For example, a raw material for an insulating component may be prepared by mixing a silicon nitride powder (85.5–92.5 parts by weight) with $Er_2O_3$ (6–10 parts by weight) and $WO_3$ (1–3 parts by weight) serving as sintering aids. The resulting raw material for an insulating component (35–55% by weight) and a WC powder (45–65% by weight) serving as a raw material for a conductive component may be mixed. The temperature of calcining may be 600–800° C. Firing may be performed in a vacuum or an inert atmosphere other than a nitrogen atmosphere.

What is claimed is:

1. A ceramic heater comprising a substrate and a heating resistor embedded in the substrate, said heating resistor is formed of a silicon nitride ceramic containing silicon nitride in a predominant amount, a conductive component, and a rare earth element (RE), wherein the rare earth element is contained in an amount of 1–6 mol % as reduced to $RE_2O_3$;

the mole ratio of residual oxygen to $RE_2O_3$ is 1–5, the amount of residual oxygen being expressed on a silicon oxide ($SiO_2$) basis and being obtained by subtracting the amount of oxygen contained in a rare earth element oxide from the total amount of oxygen contained in the heating resistor; and a predominant phase of the heating resistor other than conductive component and the silicon nitride is melilite ($RE_2O_3 \cdot Si_3N_4$).

2. A ceramic heater according to claim 1, wherein the heating resistor contains one or more elements selected from the group consisting of Ti, Zr, Hf, V, Nb, Ta, Cr, Mo and W.

3. A ceramic heater according to claim 1, wherein the mole ratio of residual oxygen to $RE_2O_3$ is 2–5.

4. A ceramic heater comprising a substrate and a heating resistor embedded in the substrate, said heating resistor is formed of a silicon nitride ceramic containing silicon nitride in a predominant amount, a conductive component, and a rare earth element (RE), wherein the rare earth element is contained in an amount of 1–6 mol % as reduced to $RE_2O_3$;

the mole ratio of residual oxygen to $RE_2O_3$ is 2–5, the amount of residual oxygen being expressed on a silicon oxide ($SiO_2$) basis and being obtained by subtracting the amount of oxygen contained in a rare earth element oxide from the total amount of oxygen contained in the heating resistor; and a predominant phase of the heating resistor other than conductive component and the silicon nitride is disilicate ($RE_2Si_2O_7$).

5. A ceramic heater according to claim 4, wherein the heating resistor contains one or more elements selected from the group consisting of Ti, Zr, Hf, V, Nb, Ta, Cr, Mo and W.

6. A ceramic heater comprising a substrate and a heating resistor embedded in the substrate, said heating resistor is formed of a conductive silicon nitride ceramic which contains silicon nitride in a predominant amount and a conductive component, wherein a predominant phase of the conductive silicon nitride ceramic other than the conductive component and the silicon nitride assumes a crystal phase having a melting point of not lower than 1600° C.

7. A ceramic heater according to claim 6, wherein the conductive silicon nitride ceramic contains one or more elements selected from the group consisting of Ti, Zr, Hf, V, Nb, Ta, Cr, Mo and W.

8. The ceramic heater according to claim 6, wherein the heating resistor contains a rare-earth element in an amount of 1–6 mol % as reduced to $RE_2O_3$.

9. A ceramic heater comprising a substrate and a heating resistor embedded in the substrate, said heating resistor is formed of a conductive silicon nitride ceramic which contains silicon nitride in a predominant amount and a conductive component, wherein the silicon nitride ceramic contains 1–6 mol % of $RE_2O_3$, where RE is a rare earth element;

the mole ratio of residual oxygen to $RE_2O_3$ is 2–5, the amount of residual oxygen being expressed on a silicon oxide ($SiO_2$) basis and being obtained by subtracting the amount of oxygen contained in the rare earth element oxide from the total amount of oxygen contained in the heating resistor; and a predominant phase of the conductive silicon nitride ceramic other than the conductive component and the silicon nitride is disilicate ($RE_2Si_2O_7$).

10. A ceramic heater according to claim 9, wherein the conductive silicon nitride ceramic contains one or more elements selected from the group consisting of Ti, Zr, Hf, V, Nb, Ta, Cr, Mo and W.

11. A ceramic heater comprising a substrate and a heating resistor embedded in the substrate, said heating resistor is formed of a conductive silicon nitride ceramic which contains silicon nitride in a predominant amount and a conductive component, wherein the silicon nitride ceramic contains 1–6 mol % of $RE_2O_3$, where RE is a rare earth element;

the mole ratio of residual oxygen to $RE_2O_3$ is 1–5, the amount of residual oxygen being expressed on a silicon oxide ($SiO_2$) basis and being obtained by subtracting the amount of oxygen contained in the rare earth element oxide from the total amount of oxygen contained in the heating resistor; and a predominant phase of the conductive silicon nitride ceramic other than the conductive component and the silicon nitride is melilite ($RE_2O_3 \cdot Si_3N_4$).

12. A ceramic heater according to claim 11, wherein the conductive silicon nitride ceramic contains one or more elements selected from the group consisting of Ti, Zr, Hf, V, Nb, Ta, Cr, Mo and W.

13. A ceramic heater according to claim 11, wherein the mole ratio of residual oxygen to $RE_2O_3$ is 2–5.

* * * * *